United States Patent

Hjorsberg et al.

(10) Patent No.: US 7,854,161 B2
(45) Date of Patent: Dec. 21, 2010

(54) DIAGNOSTIC METHOD FOR AN EXHAUST AFTERTREATMENT SYSTEM

(75) Inventors: Ove Hjorsberg, Asperö (SE); Henrik Svenningstorp, Göteborg (SE); Charlotte Holmen, Torslanda (SE)

(73) Assignee: Volvo Lastvagnar AB, Gothenburg (SE)

( * ) Notice: Subject to any disclaimer, the term of this patent is extended or adjusted under 35 U.S.C. 154(b) by 169 days.

(21) Appl. No.: 12/088,712

(22) PCT Filed: Sep. 29, 2005

(86) PCT No.: PCT/SE2005/001447

§ 371 (c)(1),
(2), (4) Date: Jun. 10, 2008

(87) PCT Pub. No.: WO2007/037730

PCT Pub. Date: Apr. 5, 2007

(65) Prior Publication Data

US 2009/0049899 A1    Feb. 26, 2009

(51) Int. Cl.
*G01M 15/10* (2006.01)

(52) U.S. Cl. .................. 73/114.75; 73/114.71
(58) Field of Classification Search ............ 73/114.69, 73/114.71, 114.75
See application file for complete search history.

(56) References Cited

U.S. PATENT DOCUMENTS

| | | | |
|---|---|---|---|
| 5,522,218 A | 6/1996 | Lane et al. | |
| 6,079,203 A | 6/2000 | Wakamoto | |
| 6,928,806 B2 * | 8/2005 | Tennison et al. | 60/286 |
| 2003/0051468 A1 | 3/2003 | Van Nieuwstadt et al. | |
| 2008/0103684 A1 * | 5/2008 | Allmer et al. | 701/114 |
| 2010/0071451 A1 * | 3/2010 | Matsunaga et al. | 73/114.71 |

FOREIGN PATENT DOCUMENTS

EP    1426575 A1    6/2004

OTHER PUBLICATIONS

International Search Report from corresponding PCT/SE2005/001447.
International Preliminary Report on Patentability from corresponding PCT/SE2005/001447.
European Search Report for corresponding EP 05 78 8533.

* cited by examiner

*Primary Examiner*—Eric S McCall
(74) *Attorney, Agent, or Firm*—WRB-IP LLP

(57) ABSTRACT

A diagnostic method for testing malfunction of a Selective Catalytic Reduction (SCR) exhausts aftertreatment system of an internal combustion engine. The method measures and registers a first mean NOx sensor value for a normal mass flow level of a fluid reducing agent, then a second mean NOx sensor value related to a higher mass flow level is measured and registered. The two registered NOx sensor values are compared and it is determined if, on one hand, the first value is higher than the second value, or, on the other hand, the first value is lower than the second value. The cause of the malfunction may be found in the dosing system or in the SCR catalyst.

12 Claims, 1 Drawing Sheet

US 7,854,161 B2

DIAGNOSTIC METHOD FOR AN EXHAUST AFTERTREATMENT SYSTEM

TECHNICAL FIELD

The present invention relates to the field of a diagnostic method for testing malfunction of a Selective Catalytic Reduction (SCR) aftertreatment system for reduction of NOx in an exhaust gas passage of an internal combustion engine.

BACKGROUND AND SUMMARY

Vehicles equipped with diesel or another lean burn engine offer the benefit of increased fuel economy, however, control of nitrogen oxide (NOx) emissions from such engines is needed due to the high content of oxygen in the exhaust gas. In this regard, Selective Catalytic Reduction (SCR) catalysts, in which NOx is continuously removed through active injection of a reductant, such as urea, into the exhaust gas mixture entering the catalyst, are know to achieve high NOx conversion efficiency.

A typical lean burn exhaust gas aftertreatment system is described in U.S. Pat. No. 6,928,806 and includes a SCR catalyst for converting NOx in the engine exhaust gas mixture by means of injection of a reductant agent. NOx sensors upstream and downstream of the SCR are coupled in the path of the exhaust gas entering and exiting the SCR catalyst. The outputs of these sensors are read by controller 12 and may be used to determine the NOx conversion efficiency of the SCR.

The above described aftertreatment system enables detection of a malfunction in the NOx conversion system, however, the cause of the malfunction may be found in the urea-dosing system or in the SCR catalyst. For example, the urea-dosing system may be clogged, or the SCR catalyst may be deactivated.

Thus, there is a need of a diagnostic tool for diagnosis of SCR catalyst systems, to facilitate service and repair.

It is therefore desirable that the present invention provide a diagnosis method which is capable of accurately diagnosing the cause of malfunction.

The aspect of the present invention resides in a diagnostic method for testing malfunction of a Selective Catalytic Reduction (SCR) aftertreatment system for reduction of NOx in an exhaust gas passage of an internal combustion engine, the SCR system comprising a dosing system that injects a fluid reducing agent into the exhausts upstream a catalyst reactor and a downstream side NOx sensor for supervising the NOx emission in the exhausts downstream the SCR reactor, the diagnostic method comprising the steps of: setting the torque range and the speed range of the engine to a predetermined interval and adjusting the fluid agent mass flow to a level which is normal for this interval; measuring and registering a first mean NOx sensor value for the mass flow level, increasing the fluid agent mass flow to a level which is higher than normal for the interval; measuring and registering a second mean NOx sensor value related to the higher mass flow level; and comparing the two registered NOx sensor values and determining if on one hand, the first value is higher than the second value, or on the other hand, the first value is lower than the second value.

The other features of this invention will become understood from the following description with reference to the accompanying drawings.

BRIEF DESCRIPTION OF THE DRAWINGS

The invention will be described in greater detail below with reference to embodiments shown in the accompanying drawings, in which FIG. 1 diagrammatically illustrates an internal combustion engine with an aftertreatment system for utilizing the invention.

DETAILED DESCRIPTION

Figure 1:
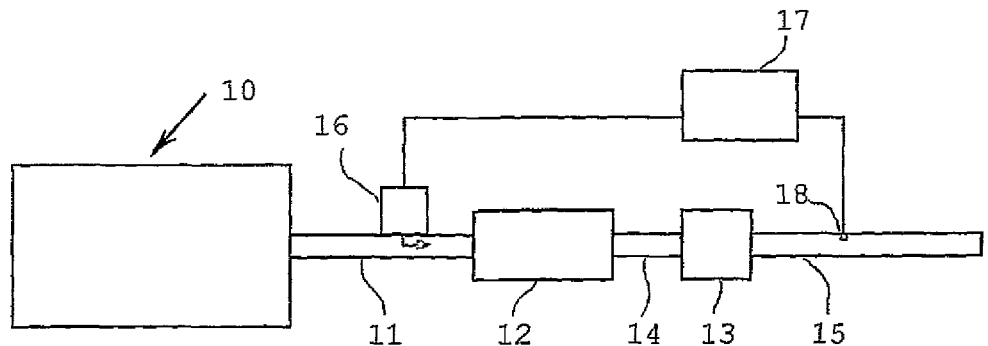

FIG. 1 shows a general configuration of an exhaust aftertreatment system for an internal combustion engine 10, including a first exhaust pipe segment 11 leading exhausts from the engine to a urea based Selective Catalyst Reduction (SCR) catalyst 12. The engine can for example be a diesel engine for a heavy duty vehicle. The SCR catalyst is connected to a clean-up catalyst reactor 13 via a second exhaust pipe segment 14. A third exhaust pipe segment 15 leads the exhausts from the reactor 13 to the atmosphere.

The SCR catalyst is, preferably, a base metal/zeolite formulation. Reductant, such as aqueous urea, is stored in a storage vessel (not shown) and delivered to a reductant delivery system 16 coupled to the pipe segment 11 upstream of SCR catalyst 12. The reductant is metered out by a pump through a control valve and an injector, where both the pump and the valve is controlled by a controller 17, preferably a microprocessor. A NOx sensor 18 is coupled to the pipe segment 15 downstream the clean-up catalyst 13. The reductant metering is based on input data, for example engine torque load, engine speed and output from the NOx sensor 18.

If and when a malfunction occurs in aftertreatment system, i.e. the registered tail-pipe NOx level exceeds a desired limit, one needs to determine what component in the system is malfunctioning. Firstly, it is appropriate to check that there is urea in the solution and that the NOx sensor is not faulty.

If it is established that urea is present and the NOx sensor is reliable, the malfunction can only result from either that the catalyst is deactivated or that the urea-dosing system is clogged (or possibly both). It is in this situation that the diagnose method of the invention is useful. Isolating the faulty component is of great value for service and repair. It is also possible that future on-board diagnosis legislation will require that the faulty component is isolated.

Figure 2:
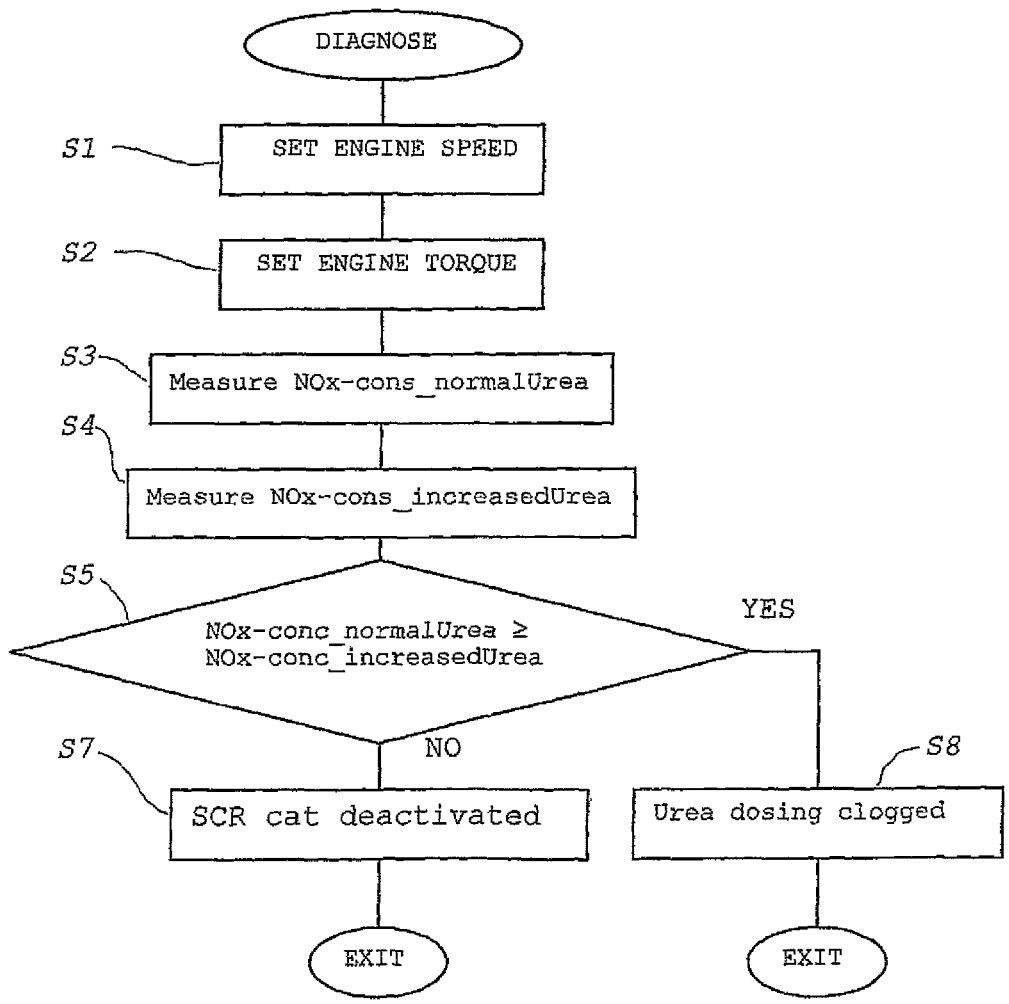
FIG. 2 is a flowchart showing a malfunction diagnosis according to the invention.

The details of the reduction system diagnosis according to the invention are explained with reference to the flowchart in FIG. 2.

The situation is that the NOx sensor 18 downstream the SCR system has indicated that tail-pipe NOx is increased. Before the diagnosis it has also be established that there is urea in the solution dosed by the dosing system and that the NOx sensor is indicating the correct value.

The purpose of the suggested method is to determine whether tail-pipe NOx is too high due to that the catalyst is deactivated or that the urea-dosing system is clogged and therefore injects too little urea. A prerequisite for the method to give the correct result is that the control of the urea mass flow is such that it yields a tail-pipe NOx that is the minimum of: a) Desired tail-pipe NOx concentration b) Minimum tail-pipe NOx concentration with respect to present catalyst activity In step S1 and step S2, requirements on engine torque and engine speed are set. Possibly, the load-point range is restricted, and, secondly and most importantly, the load point must be roughly the same during the time that the diagnosis is carried out. This is due to that the method uses the N0x-sensor value and if the engine-out NOx concentration differs strongly during the diagnosis, this will drown the variation that is to be detected. (Thus, if the deviation from the initial load point becomes too large, the procedure must be interrupted and restarted at the new load-point, etc.)

In step S3, the urea mass flow is kept at the normal value determined by the urea control system. The mean NOx-sensor value downstream the catalyst is measured. This value is here called "NOx-conc_normalUrea".

In step S4, the urea mass flow is increased so that it is somewhat higher than the normal value for the present load point, and the mean NOx-sensor value is measured. This value is here called "NOx-conc_increasedUrea".

Now, the two NOx-sensor signals are compared in step S5. Two outcomes are defined:
A)  NOx-conc_normalUrea≧NOx-conc_increasedUrea→ urea-dosing system is clogged
B)  NOx-conc_normalUrea<NOx-conc_increasedUrea→ SCR catalyst is deactivated When step S5 is true, the urea dosing system is clogged and the urea dosing is not sufficient according to step S8. Then, increasing the urea dosing will increase the conversion of NOx in the catalyst or, possibly, the clogging is so severe that the increase in dosing does not result in any extra injected urea at all. Both these cases are covered by A.

stream side NOx sensor for supervising NOx emission in the exhaust downstream from the reactor, the diagnostic method comprising the steps of:

setting a torque range and a speed range of the engine to a predetermined interval and adjusting a fluid agent mass flow to a level which is normal for the interval, measuring and registering a mean NOx sensor value for the mass flow, increasing the mass flow to a level which is higher than normal for the interval, measuring and registering another mean NOx sensor value related to the increased mass flow, comparing the two registered NOx sensor values and determining if, on one hand, the NOx sensor value for normal mass flow is higher than the NOx sensor value for increased mass flow, or, on the other hand, the NOx sensor value for normal mass flow is lower than the NOx sensor value for increased mass flow.

2. A method according to claim 1, comprising the additional step of controlling the value for normal mass flow to be equal to the value for increased mass flow.

3. A method according to claim 1, comprising the additional step of determining a type of injected fluid agent.

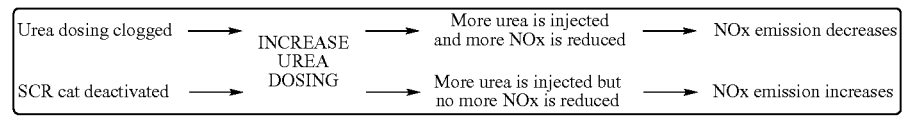

When step S5 is not true, it is the catalyst that is faulty according to step S7 and the increase in urea mass flow will not increase the conversion of NOx, since the catalyst is already working at its maximum capacity. Instead, the excess NH3 will be detected by the NOx sensor as an increased NOx concentration. This results from that the NOx sensor is cross sensitive to NH3. Moreover, the clean-up catalyst downstream the SCR catalyst oxidizes the NH3 to NOx before it reaches the NOx sensor 18.

Alternatively a variable calculated from the N0x-sensor concentration is used instead of the NOx concentration (e.g. the NOx conversion).

One advantage with the method is that it compares the relative size of two measured values. It is thus not dependent on any absolute values.

The invention is not to be regarded as being limited to the illustrative embodiments described above, but a number of variants and modifications are possible within the scope of the following patent claims. For example, the aftertreatment system of FIG. 1 may include a particulate filter.

The invention claimed is:

1. A diagnostic method for testing and diagnosing a cause of malfunction of a Selective Catalytic Reduction (SCR) aftertreatment system for reduction of NOx in an exhaust gas passage of an internal combustion engine, the SCR system comprising a dosing system that injects a fluid reducing agent into exhaust upstream from a catalyst reactor and a down- 4. A method according to claim 1, comprising the additional step of determining that the NOx sensor operates correctly.

5. A method according to claim 1, wherein a clean-up catalyst is positioned in the aftertreatment system between the SCR catalyst and the NOx sensor.

6. A method according to claim 2, comprising the additional step of determining a type of injected fluid agent.

7. A method according to claim 2, comprising the additional step of determining that the NOx sensor operates correctly.

8. A method according to claim 3, comprising the additional step of determining that the NOx sensor operates correctly.

9. A method according to claim 2, wherein a clean-up catalyst is positioned in the aftertreatment system between the SCR catalyst and the NOx sensor.

10. A method according to claim 3, wherein a clean-up catalyst is positioned in the aftertreatment system between the SCR catalyst and the NOx sensor.

11. A method according to claim 4, wherein a clean-up catalyst is positioned in the aftertreatment system between the SCR catalyst and the NOx sensor.

12. A method according to claim 1, comprising providing a malfunction indication if the NOx sensor value for normal mass flow is higher than the NOx sensor value for increased mass flow.

* * * * *